April 28, 1931.   C. ADLER, JR   1,803,292
AUTOMATIC SIGNAL FOR AUTOMOBILES
Filed Nov. 21, 1927   4 Sheets-Sheet 1

Inventor
Charles Adler Jr.

Charles B. Mann Jr.
Attorney

April 28, 1931.     C. ADLER, JR     1,803,292

AUTOMATIC SIGNAL FOR AUTOMOBILES

Filed Nov. 21, 1927     4 Sheets-Sheet 2

Inventor
Charles Adler Jr.
By Charles B. Adler Jr.
Attorney

April 28, 1931.   C. ADLER, JR   1,803,292
AUTOMATIC SIGNAL FOR AUTOMOBILES
Filed Nov. 21, 1927   4 Sheets-Sheet 3

Inventor
Charles Adler Jr.
By
Charles B. Mann Jr.
Attorney

April 28, 1931.  C. ADLER, JR  1,803,292
AUTOMATIC SIGNAL FOR AUTOMOBILES
Filed Nov. 21, 1927  4 Sheets-Sheet 4
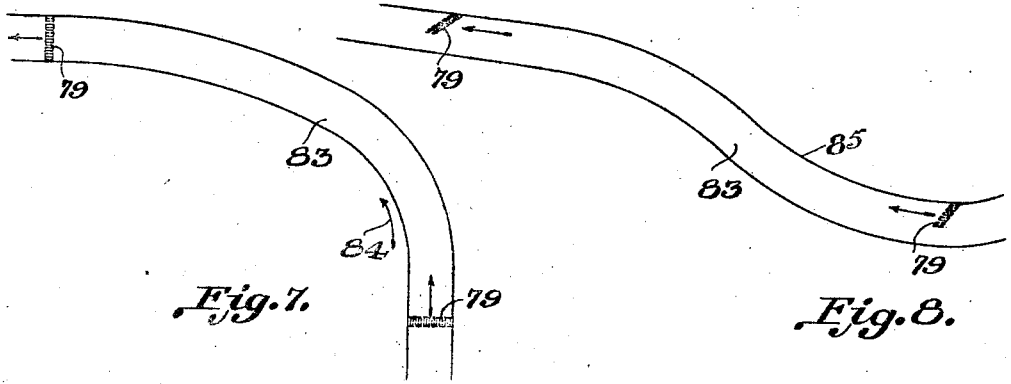
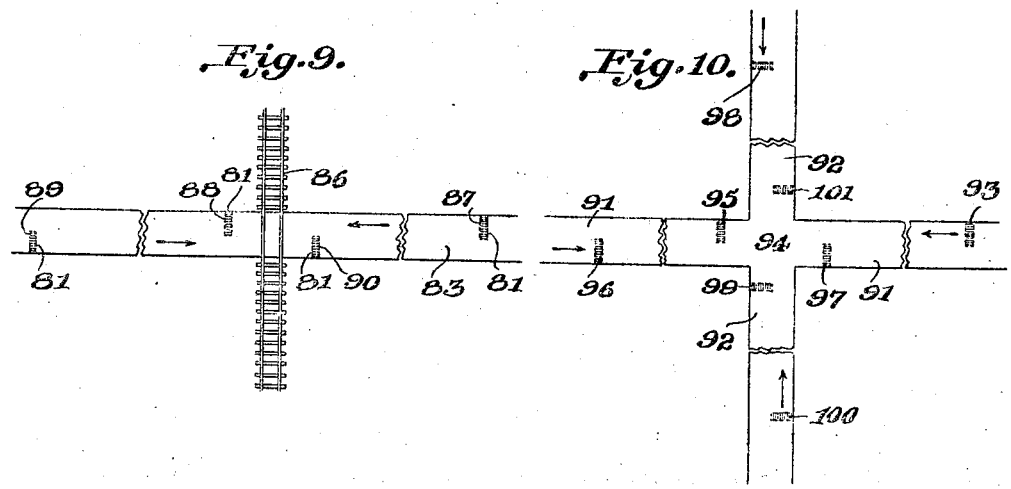
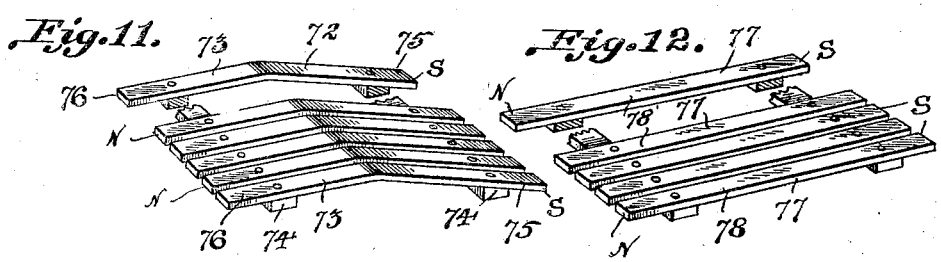

Patented Apr. 28, 1931

1,803,292

UNITED STATES PATENT OFFICE

CHARLES ADLER, JR., OF BALTIMORE, MARYLAND, ASSIGNOR TO THE ADLER SAFETY CONTROL COMPANY, OF BALTIMORE, MARYLAND, A CORPORATION OF MARYLAND

AUTOMATIC SIGNAL FOR AUTOMOBILES

Application filed November 21, 1927. Serial No. 234,779.

This invention relates to an automatic signal system for automobiles during the travel of the latter on trackless highways and has for its object to provide a signal device on the moving automobile which will inform the driver, by various signals, of highway conditions ahead of the automobile in so far as curves, steep down-grades, cross-roads or railway crossing are concerned in order that the driver may be warned that he is approaching a danger zone and may also be informed as to the character of the danger being approached.

The present invention combines signal mechanisms and controlling means carried on the automobile with magnetic means arranged along the highway whereby, not only may a warning signal be given to the driver, but signals which differ one from another may be given on the automobile to indicate to the driver the nature of the danger zone he is approaching.

More particularly stated, the invention also includes a plurality of signal devices with selective relays and magnetic breaker elements on the automobile with permanent magnets in the highway so arranged that certain magnetic poles of those magnets will cooperate with certain poles of the magnetic breaker elements on the automobile to produce a desired signal while other combinations of magnetic poles are utilized to produce other signals.

The invention is illustrated in the accompanying drawings, wherein,—

Figure 1:
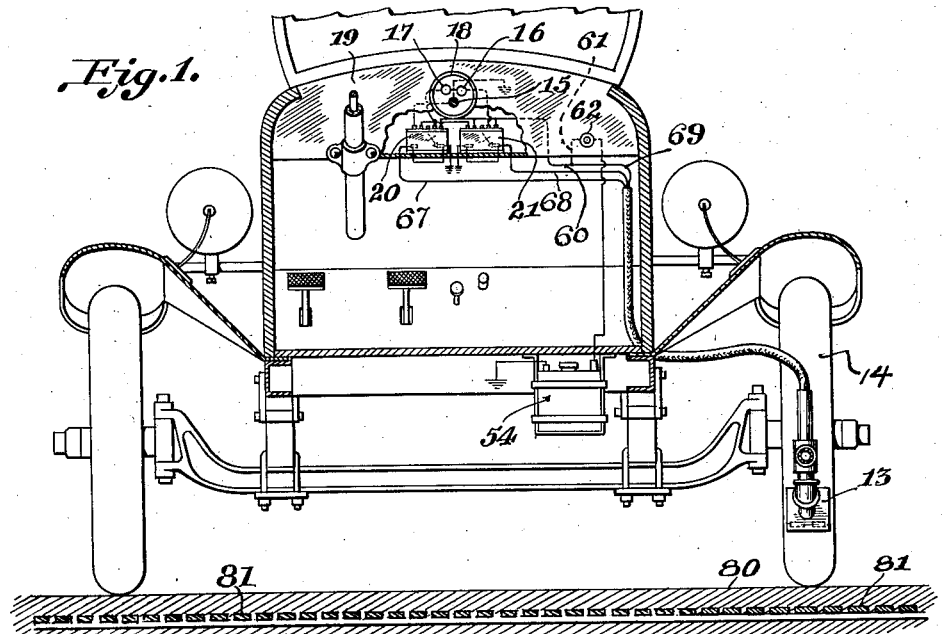

Fig. 1. shows a vertical sectional view through an automobile looking forward from the inner side of the instrument panel toward the front wheels to show the locations of the signal lamps; the selective relays and the breaker device at the rear of the front wheel.

Figure 2:
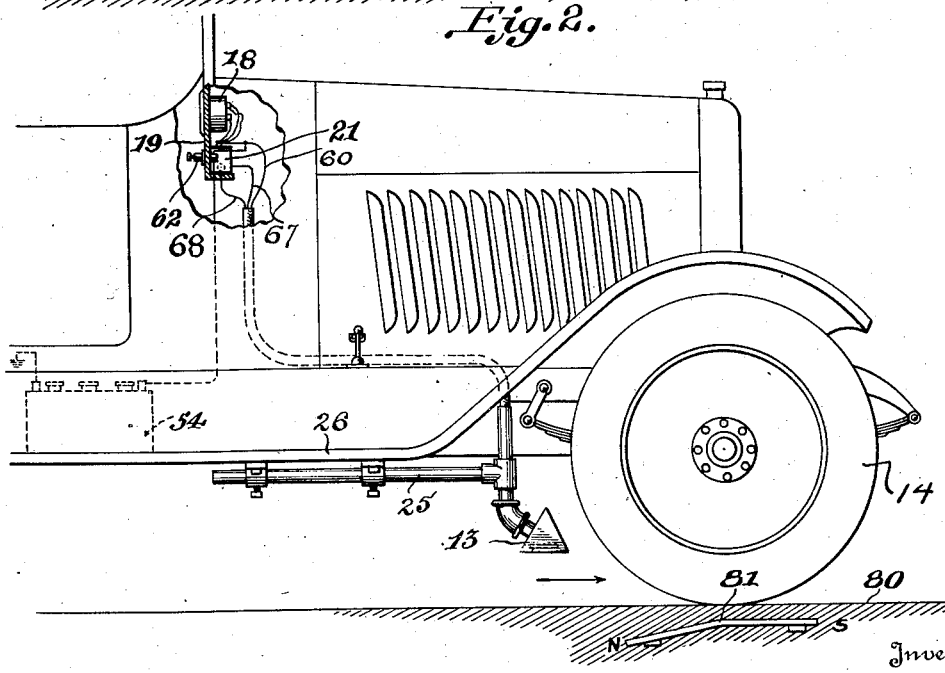

Fig. 2. illustrates the same parts in sectional side elevation.

Figure 3:
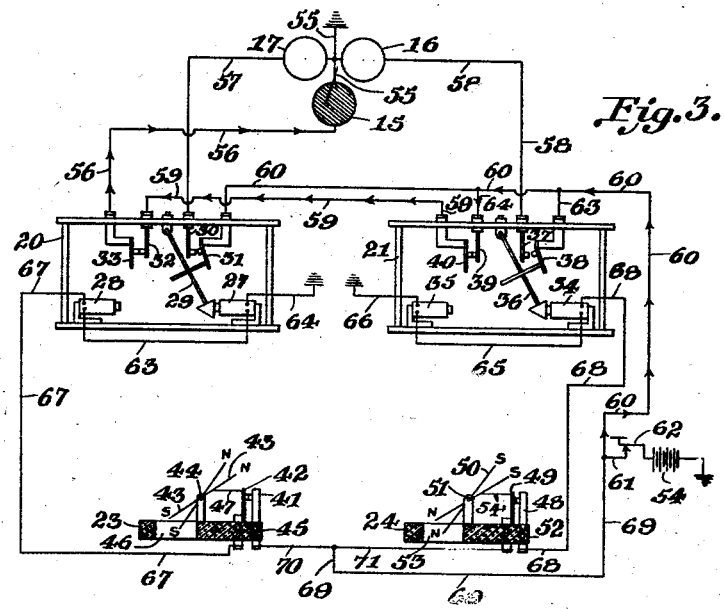

Fig. 3. shows in a diagrammatic way the signal devices; the selective relays and breaker devices with the wiring connections between them and with the parts in the normal condition to give a clear signal or indication.

Figure 4:
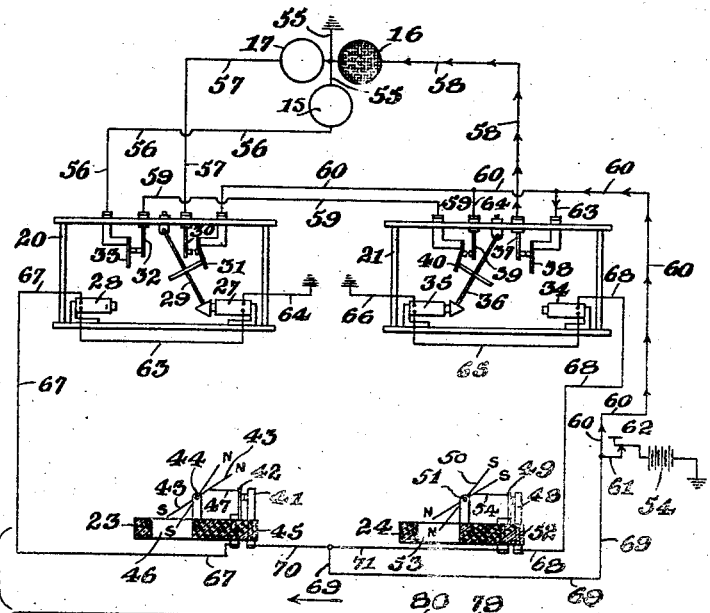

Fig. 4 illustrates another diagrammatic view of the same elements on the automobile and also shows the highway element to cause the parts to be operated so as to give another signal.

Figure 5:
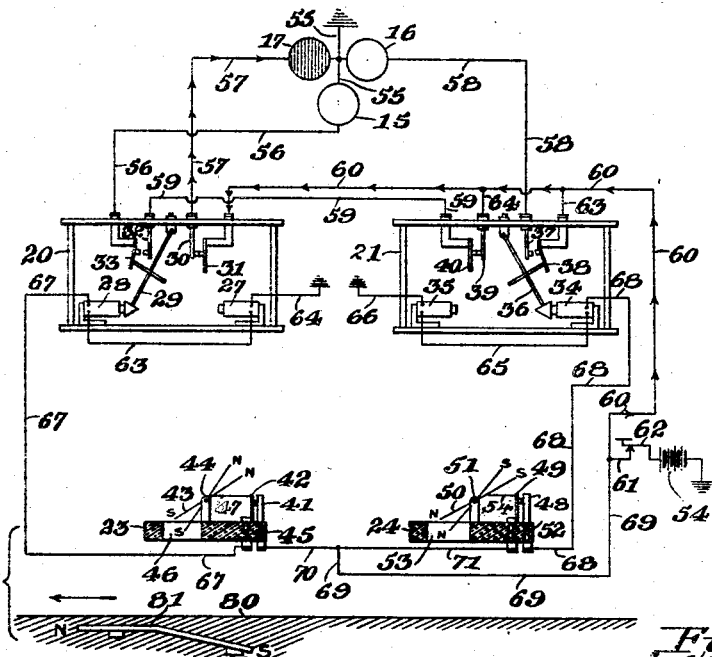

Fig. 5. shows a similar view but with the parts in position to give another signal or indication.

Figure 6:
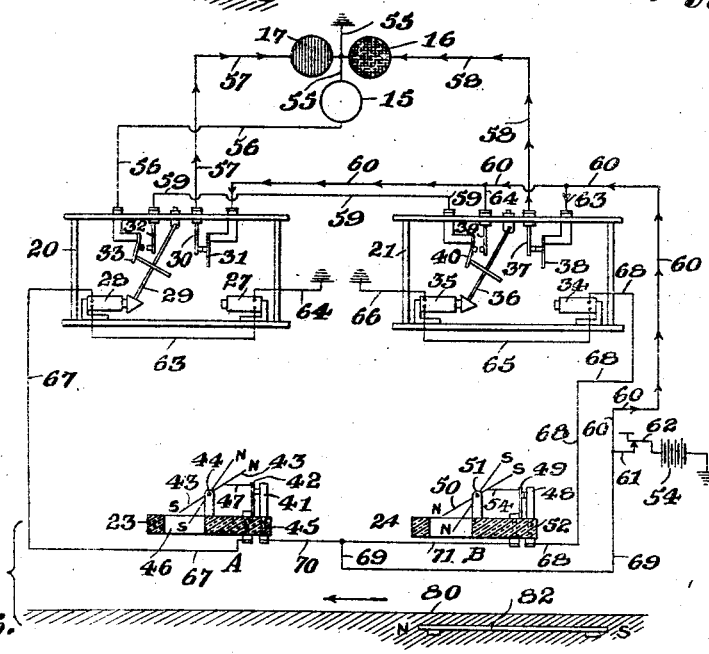

Fig. 6. illustrates a similar view but with the parts in position to produce a different signal.

Fig. 7. shows highway installations for two forms of danger zones.

Fig. 8. illustrates another form of highway installation for traffic in one direction.

Fig. 9. shows a highway installation for operating the signal for a railroad crossing.

Fig. 10. illustrates another highway installation for operating the signal for a cross-road.

Fig. 11. shows one form of highway magnet, and

Fig. 12. illustrates another form of highway magnet.

I have demonstrated in practice that permanent magnet structures may be located at the approach to danger zones along a trackless highway and that said structures will operate devices on a moving automobile to control the latter or to give a signal.

I have also discovered that by utilizing the north pole, south pole or both poles of a permanent magnet, when properly arranged along a highway, that I am able to provide a series of signals on the automobile that will give to the driver a practically continuous indication of the highway conditions ahead so that not only will the driver be informed of his approach to a danger zone but he will be informed of the character of that danger zone.

For example, if a driver is approaching a railroad crossing, I am able to give him an indication that he is approaching such a crossing.

If he is approaching a cross-road, I am able to give him an indication that it is a cross-road and not a railroad or a sharp curve.

If the danger zone ahead consists of a sharp curve or down grade, I can give another indication to advise the driver of the same.

All of these indications can be transmitted to the driver by the use of permanent magnets along the highway.

In carrying out my invention, I preferably use as a signal on the automobile, a series of lamps,—say for example; green, yellow and red lamps.

A green lamp may be understood to mean that the road conditions are all right and that there are no danger zones near enough ahead to call for any but ordinary precautions in driving.

A yellow lamp may be understood to mean that there is a sharp curve or a steep down grade ahead.

A red lamp may indicate that a railroad crossing is being approached, or

A combination of red and yellow may mean that a cross-road is ahead.

Other combinations such as flashes from a lamp may as readily be provided but it is believed that the present examples are sufficient to disclose the scope of the invention.

On the automobile, I provide a series of lamps or other signaling devices, but lamps are preferable, and are indicated by the numerals 15—16 and 17 respectively.

The lamp 15 may be regarded as green; the lamp 16 as yellow and the lamp 17 as red in color.

These lamps may be located in case 18 and attached to the instrument board 19 of the automobile within the view of the driver.

On the automobile, I also provide what I term two selective relays 20 and 21 respectively.

These relays may be located at any desirable place on the automobile but in the disclosure in Figs. 1 and 2 are shown as being under the instrument-board 19.

I have also provided on the automobile what I term circuit breakers or breaker elements 23 and 24, and while these may be located at various places on the machine, I have found it desirable to place them at the rear of the front wheel 14 and on the right hand side of the automobile, for purposes that will presently be explained.

The breaker elements are carried in a casing 13, and in practice this casing is supported by a tubular bracket 25, extending from beneath the running-board 26 or frame of the automobile so that certain wires leading to and from said breaker elements may be run through the tubular bracket and protected.

In Figs. 3, 4, 5 and 6 of the drawings the lamps, selective relays and breaker elements are shown in each instance diagrammatically and while each of those views illustrate the same elements and parts, the positions of certain of the parts are different because each shows circuit connections for giving a signal indication differing from the others.

In Fig. 3, the parts are all in what may be termed a normal running condition so as to give a normal green light indication and by reference therefore to this Fig. 3, the devices and parts thereof will be explained in detail.

The selective relay 20 has two electromagnets 27 and 28 and a pendulum-bar 29 is mounted in the case so as to swing between and from one magnet to the other.

On one side of the pendulum-bar 29, there is a stationary contact plate 30 and also a movable contact-plate 31 to engage with the latter, while on the other side of the pendulum-bar there is a second stationary contact plate 32 and a movable plate 33 to coact therewith.

The two movable contact-plates 31 and 33 on opposite sides of the pendulum-bar are, in this instance, so arranged that when the pendulum-bar is held by electro-magnet 27, it will engage movable contact-plate 31 and hold the latter out of engagement with the stationary contact-plate 30, whereas, when the pendulum-bar swings over to magnet 28, it will free the contact-plate 31 and allow it to close against contact-plate 30.

When the pendulum-bar 29 does swing over to and is held by electro-magnet 28, then said bar engages the movable contact-plate 33 and moves it out of engagement with contact-plate 32.

Thus pendulum-bar 29, when in the normal position in this Fig. 3, will hold contacts 31 and 30 apart and when in the other position will hold contacts 33 and 32 apart.

Selective relay 21 has precisely the same construction as relay 20 for there are two spaced electro-magnets 34 and 35, with a pendulum-bar 36 mounted so as to swing from one magnet to the other and on one side of this pendulum-bar there is a stationary contact 37 and a movable contact 38 which the pendulum-bar normally holds open, while on the other side of the pendulum-bar there is a stationary contact-plate 39 and a movable plate 40 which latter plates are normally engaged.

The two selective relays are therefore exactly alike in construction and operation.

With each relay, I utilize a breaker element,—there being one breaker-element 23 to coact with selective relay 20 while a breaker element 24 coacts with the selective relay 21.

The breaker element 23 has a stationary contact 41 and a movable contact 42 to coact therewith, and this breaker-element also has a needle-bar structure with two needles 43 pivotally mounted at 44, so both needles may oscillate together.

The base 45 of the breaker-element has a slot 46 therein and the lower ends of the needle-bars 43 have position over this slot.

A link-bar or wire 47, connects the two needle-bars with the movable contact-plate 42, so that when the needle-bar is given a sudden oscillation it will operate the link-bar and momentarily pull contact 42 away from contact 41, thereby momentarily opening a circuit at that point.

Both needle-bars 43 are magnetized and in the breaker-element 23, the north-pole-ends of these needle-bars are uppermost while the south-pole-ends of said two needle-bars are both lowermost,—the two ends of the needle-bars being distinguished by the letters N for the north-pole-ends and by the letters S for the south-pole-ends.

The breaker-element 24 has precisely the same construction as element 23 but it is necessary to separately describe it in order that the circuits may be traced out.

This breaker-element 24 has a stationary contact 48 and a movable contact 49 to coact therewith and it also has a needle-bar structure with two needles 50, which are pivotally mounted at 51 so both needles may oscillate together.

The base 51 also has a slot 53, and the lower ends of the needle-bars 50 have positions over this slot.

A link-bar 54 connects the two needle-bars with the movable contact-plate 49 so that when an oscillation of these needle-bars 50 takes place, the link will be operated to momentarily pull the movable contact-plate 49 away from the stationary contact 48 and thereby momentarily open a circuit at that point.

The needle-bars 50 are also magnetized and have north and south pole ends and in this breaker 24, the north-pole-ends are lowermost and are identified by the letters N while the south-pole-ends of these needle-bars 50 are uppermost and are identified by the letters S.

It will thus be seen that the needle-bars 43 of the breaker-element 23 and the needle-bars 50 of the breaker 24 have their poles reversed so that in the former the north-pole ends are up while in the latter the south-pole ends are up.

These two breaker-elements 23 and 24 may be installed on an automobile either side-by-side or one in advance of the other, but both are advantageously placed on the right hand side of the automobile as will presently be fully explained.

The two selective relays 20 and 21 and the two breaker-elements 23 and 24 are arranged to control certain electric circuits from a current-supply or battery 54 carried on the automobile and these circuit connections will now be described.

*Circuit connections between relays and lamps*

The lamps 15, 16 and 17 are all shown as having a common ground connection 55.

From the (green) lamp 15, there is a wire connection 56 which leads to and connects with the post of the movable contact 33 of selective-relay 20.

From the (red) lamp 17, there is a wire 57 which leads to and connects with the binding post of stationary contact 30 of relay 20.

From the (yellow) lamp 16, a wire 58 extends to and connects with the binding-post of stationary contact 37 of relay 21.

In each of the diagrammatic views of Figs. 3, 4, 5 and 6 of the drawings, only those lamps through which electric circuits are closed, are lined to indicate their color as this enables the circuits to be more readily traced, therefore in Fig. 3 the lamp 15 is lined to indicate green because the normal circuit is closed through that lamp and the latter is illuminated.

*Selective relay circuit connections*

The stationary contact 32 of relay 20 and the movable contact 40 of the relay 21 are connected by wire 59, while the movable contact 31 of relay 20 is connected to the battery 54, by wires 60, 61 and a switch 62.

From wire 60, there is a branch 63 which connects with the movable contact 38 of relay 21 and another branch 64 which connects with the stationary contact 39 also of said relay 21.

Thus it will be seen that wire 60 from the battery will supply current to movable and stationary contacts 38 and 39 respectively of relay 21 and will also supply current to movable contact 31 of relay 20.

Electro-magnets 28 and 27 of selective-relay 20 are connected by a wire 63 while a ground wire 64 is provided from magnet 27 to the frame of the automobile, so the circuit may be completed through the frame to the battery 54, which latter also has one side grounded to the automobile frame.

The electro-magnets 35 and 34 of relay 21 are also connected by a wire 65, and magnet 35 has a ground wire 66.

The electro-magnets 27 and 28 of relay 20 are controlled through breaker-element 23, while the electro-magnets 34 and 35 of relay 21 are controlled through breaker-element 24.

*Breaker-element circuit connections*

The breaker-element 23 has a wire connection 67 from the post of its movable contact 42, to the electro-magnet 28 of the selective relay 20, while the breaker-element 24 has a wire connection 68, from the post of its stationary contact 48 to the electro-magnet 34.

A current supply wire 69 leads from the battery-wire 61 toward the two breaker-elements 23 and 24 and has one branch 70 which connects with the post of stationary contact 41 of element 23 and another branch 71 which connects with the post of movable contact 49 of breaker-element 24.

It will thus be seen that both breaker-elements 23 and 24 have connections with the current-supply or battery and that the circuit through the breaker-element 23 is maintained through the contacts 41 and 42 while the circuit through the breaker-element 24 is maintained through the contacts 48 and 49.

Obviously, if the needle-bars 43 of breaker-element 23 are momentarily oscillated, they will actuate link 47 and momentarily separate contacts 41 and 42 and thus cut off the passage of current through wire 67 to electro-magnet 28 of the selective-relay 20, thereby momentarily deenergizing both electro-magnets 28 and 27 of the relay 20 and allow the pendulum 29 to drop away from magnet 27 and swing toward magnet 28, and by the time the pendulum reaches magnet 28 the latter has again become energized (because contacts 41—42 of breaker 23 immediately close after being opened) and the pendulum 29 will be held by the electro-magnet 28.

The breaker-element 24 operates in precisely the same manner when its needle-bars 50 are momentarily oscillated, in that link 54 is pulled and contacts 48 and 49 are separated so that passage of current by wire 68 to electro-magnet 34 is interrupted long enough to momentarily deenergize electro-magnets 34 and 35 of relay 24, and thereby allow pendulum-bar 36 to swing over to magnet 35 which latter, during the swinging of the pendulum-bar, will again become energized and thus attract and hold the pendulum-bar on that side of the relay.

Before entering upon an explanation of the circuits which produce the several signal indications, it is deemed advisable to explain the highway devices which are utilized to cooperate with the installation on the automobile because those highway devices must cooperate with one or the other or both of the breaker-elements 23 or 24 to establish the circuits necessary to produce a signal corresponding to the character of the danger zone which the automobile is approaching.

It has been explained that each breaker-element 23 and 24 has a needle-bar structure 43 or 50 and that these needle-bars are magnetized so as to have north-pole-ends and south-pole-ends.

The structure on the highway must therefore be of such nature as to cause a movement of one or the other or both of the magnetic needle-bar structures.

It is known that unlike poles of two magnetized bodies will be attracted and that like poles of two magnetized bodies have the reverse tendency, that is, to repel.

Making use of these facts, I employ along the highway permanent magnets of such a construction that I can get the benefit of either pole of the magnet separately or can utilize both poles of the said permanent magnets, so that with the north-pole-end of a highway magnet, I can operate the south-pole-ends of a needle-bar of one breaker-element or with the south-pole-ends of a highway magnet, I can operate the north-pole-ends of the needle-bar of another breaker element.

I can also locate the permanent magnet on the highway so that both of its poles may be utilized and thus operate the north-pole-ends of the needle-bar of one breaker and then the south-pole-ends of the needle-bar of the other breaker-element.

*The highway structures*

In carrying out the invention, I form a magnet structure 72, shown particularly in Fig. 11 of the drawing, which structure consists of a series of separate magnetized metal bars 73 arranged side-by-side in parallel relation and all preferably held together by a cross-beam 74 on the under side.

The metal bars in this form are preferably bent midway between their ends so that one end 75 of each bar may extend downwardly while the other end 76 of each bar may have a horizontal position.

The bends in the bars are made so that either end may be made to extend down while the other end is held horizontally.

In assembling these bars to form a complete permanent magnet-structure, all of the north-pole-ends are arranged in alinement at one side of the beam 74 while all of the south-pole ends are arranged at the other side of the beam.

In the form of magnet-structure 77 disclosed in Fig. 12 of the drawing, the magnetized bars 78 are straight from end to end but all north-pole-ends are at one side while the south-pole-ends are all located in alinement at the opposite side of the entire structure.

In practice, these magnet structures are placed in the highway below the surface of the latter and in fact are embedded in the cement or concrete roadway and completely covered.

The manner of arranging the magnets in the highway is determined by the particular operation each is to effect on the automobile.

If the breaker-element 23 with the south-pole-ends of its needle-bars 43 lowermost is to be operated, then the magnet will be placed in the highway with the north-pole-ends of its bars horizontal and nearer to the surface of the highway, and the south-pole-ends of said bars extending downwardly and further away from the highway surface.

If, however, the breaker-element 24 with the north-pole-ends of its needle-bar 50 lowermost is to be operated, then the magnet will be placed in the highway with the south-pole-ends of its bars horizontal and the north-pole-ends extending downwardly.

By this arrangement of highway magnets, only those magnetic needle-bars of the breaker on the automobile will be operated whose lowermost pole-ends are opposed to or unlike the uppermost pole-ends of the highway magnet over which they are passed.

In practice, I can, and preferably do arrange the highway magnets with respect to the danger zones thereon so that a proper signal indication will be given the driver upon approaching such danger zone, and then upon arriving at or after passing the actual point of danger, the highway magnets may automatically reset the signal circuits and give a normal safe or clear indication.

These special arrangements of highway magnets are disclosed in Figs. 7, 8, 9 and 10 of the drawings but an explanation of them will be deferred until after the circuits for giving the several signal indications have been described.

*Normal signal circuit*

By reference to Fig. 3 of the drawing, the normal signal indication will be explained.

The normal signal, which in this instance is presumed to be a green light at lamp 15, will indicate that the highway being traveled is safe and free of danger zones so that the driver may proceed accordingly.

Under these conditions the green light will be maintained as follows:

The pendulums 39 and 29 of the selective relays 21 and 20 will normally have positions at the right hand,—one being held by electro-magnet 34 while the other will be held by electro-magnet 27.

A signal circuit will therefore be maintained from battery 54 to and through green lamp 15 as follows:

From battery 54, through switch 62, wires 61 and 60 to wire 64, then through contacts 39 and 40 of selective-relay 21 to wire 59; then through contacts 32 and 33 of selective-relay 20 and by wire 56 to and through lamp 15 to ground wire 55 and back to the battery.

This circuit is indicated by darts in Fig. 3 and can thus readily be followed.

This normal green light indication will be maintained until one or the other of the pendulums 36 or 29 is shifted from the electro-magnets 34 or 27, and the shifting can only take place when one or the other or both of said electro-magnets shall become momentarily deenergized.

Deenergization of either set of electro-magnets is controlled through the breaker elements 23 or 24 or both of them, and the breaker-elements get their impulses when passing over a magnet or magnets in the highway.

*Yellow light—curve or down-grade indication*

It may next be presumed that the vehicle is approaching a danger zone consisting of a sharp curve or a down-grade and that the signal designation to indicate the approach to such a place of danger (sharp curve or down-grade) is a yellow light.

Under these conditions, and operation of the selective relay 21 alone must be made because it is through that relay that the yellow lamp circuit is controlled and also through it may the normal green lamp circuit be interrupted.

As the operation of selective relay 21 is controlled through the breaker element 24, it follows that the latter must be actuated by a magnet in the highway, which magnet will affect relay 24 but will not operate relay 23.

By reference to Fig. 4, it will be noted that the breaker element 24 has the north pole ends of its needle-bars 50 lowermost while in relay 23, the south pole ends of the needle-bars 43 are lowermost.

By locating a permanent magnet 79 in the highway 80 at the approach to a sharp curve or down-grade, as shown in Fig. 4, and arranging the south pole end of the magnet uppermost, I am able to effectively operate the needle-bar of one breaker-element without producing a similar operation of the other breaker-element as the two elements on the automobile pass over that particular magnet.

This is due to the fact that the south pole end of highway magnet 79 is uppermost and the north pole end is depressed because under those conditions the south pole end of the highway magnet 79 is alone within range of the magnetic needle-bars of the breaker elements on the automobile, and that south pole end will only operate to attract the north pole ends of the needle-bars of any breaker-element on the automobile.

Therefore as the automobile passes over the highway magnet 79 (Fig. 4) the needle-bars 43 of breaker element 23 will not be attracted by the magnet because the south pole end of the magnet and the south pole end of the said needle bars 43 will tend to be repelled instead of attracted.

But as the breaker-element 24 passes over the highway-magnet 79, the north-pole-ends of its needle-bars 50 will be attracted by the opposite south-pole-ends of the highway-magnet 79 and by such attraction will swing down and pull on the link 54, and thereby pull contact 49 away from contact 48 and thus momentarily open the normally-closed circuit to and through the electro-magnets 34 and 35 of the selective-relay 21.

This opening between the contacts 49 and 48 is only momentary, because as soon as the highway magnet 79 is passed, the needle-bar 50 will swing back and allow contacts 49 and 48 to again close, but the interruption of the circuit through the electro-magnets 34 and 35 is long enough to allow the pendulum 36 to swing away from magnet 34, and as it swings toward magnet 35, the latter again becomes energized and it will then attract and hold the pendulum 36 over on the left side of the relay 21 as shown in said Fig. 4, and this interrupts the green lamp circuit but closes a circuit through the yellow lamp 16.

The interruption of the normal green lamp circuit takes place when the pendulum engages movable contact 40 and presses it away from contact 39.

The closing however of a circuit through the yellow lamp 16 takes place as the pendulum swings away from movable contact 38 and allows the latter to close with contact 37.

This yellow lamp circuit therefore is as follows:

From battery 54 by switch 62, wires 61, 60 and 63 to contacts 38 and 37, and then by wire 58 to yellow lamp 16 and return by ground 55 back to battery.

Thus it will be seen that when the south-pole-ends of the highway magnet 79 attract the north-pole-ends of the needle-bars 50 of breaker-element 24, the selective-relay 21 will be operated to open the normally-closed green light circuit and to close the normally-open yellow light circuit because of the approach of the automobile toward a sharp curve or a steep down-grade.

I provide means for automatically resetting the circuits as or after the danger zone is passed, but explanation of the resetting operation will be deferred until the several circuits have been explained.

*Red light—railroad crossing indication*

If it now be presumed that the selective relays 23 and 24 are in their normal positions to close the normal green light circuit as shown in Fig. 3, but that the automobile is approaching a zone of danger that consists of a railroad crossing, then a signal indication which signifies a railroad crossing, which in this instance is presumed to be a red light, will be given to the driver.

To do this, that breaker element which controls the selective-relay which in turn controls the circuit to the red lamp 17 will be operated, and in this instance, such breaker-element is that designated 23, in Fig. 5 of the drawing.

To operate the needle-bars 43 of the breaker-element 23, a highway magnet 81, having its north-pole-ends elevated and its south-pole-ends depressed must be used, because the south-pole-ends of the needle-bars 43 of the said breaker-element 23 are lowermost.

When therefore, the south-pole-ends of needle-bars 43, of breaker-element 23, pass over the north-pole-ends of the magnet 81 in the highway 80, as shown in Fig. 5 of the drawing, the said needle-bars will be slightly oscillated and contacts 41 and 42 will be momentarily opened, thus deenergizing electro-magnets 28 and 27 of selective relay 20, momentarily, and allow pendulum 29 to swing from magnet 27 to magnet 28, which latter will be energized again by the time the pendulum 29 moves over, and thus magnet 28 will hold the pendulum.

The movement of pendulum from magnet 27, will first permit contacts 31 and 30 to close (they being normally open as can be seen by reference to Fig. 3) and then pendulum 29 engages contact 33 and moves it away from contact 32 and thereby opens the normal circuit to the green lamp.

As contacts 31 and 30 close, a circuit will be formed from the battery 54 to and through the red lamp 17 and back to the battery, which circuit will now be explained with reference to said Fig. 5 of the drawing, and is as follows:

From battery 54, switch 62, wires 61 and 60 to contacts 31 and 30 of selective relay 20, then by wire 57 to red lamp 17 and return by ground 55 back to the battery.

This is the only lamp circuit that can be completed under the above operation because contacts 38 and 37 to yellow lamp 16 are open and contacts 32 and 33 to the green lamp are open.

When the other breaker-element 24 also passes over the highway magnet 81, there can be no attraction between that magnet and the needle-bars 50 because like north-pole-ends of the said latter needle-bars and the highway magnet 81 will tend to repel instead of attract, and there will be no effective operation of those needle-bars.

Thus as a railroad crossing is approached, a red light will be displayed and indicate to the driver of the automobile the precise nature of the danger ahead.

After this danger zone is passed, the relays again assume their normal positions to give a green-light indication.

*Red and yellow light—cross-roads indication*

Again presuming the relays to be in their normal positions so as to close the normal green light circuit, but with the automobile approaching a cross-roads danger zone, the indicating signal for which will be a red and a yellow light.

Under these conditions, both breaker elements 23 and 24 will be operated,—the former to operate the red lamp 17 and the latter to operate the yellow lamp 16.

This means that the highway magnet or magnets must be arranged so that a north-pole-end thereof may be utilized to operate breaker element 23, while a south-pole-end thereof may be utilized to operate breaker-element 24.

Instead of utilizing two separate magnets, —one with the north-pole-ends up and the other with its south-pole-ends up, I have found that the magnet structure 82 may be flat or horizontal in the highway 80 so that its north-pole-end may be utilized to attract needle-bars 43 of breaker 23 while its south-pole-ends may be utilized to attract the needle-bars 50 of the breaker 24. Thus the one highway magnet structure 82, may be utilized to actuate both breaker-elements 23 and 24.

When therefore the automobile passes over highway magnet 82, as shown in Fig. 6 of the drawing, the south-pole-ends of needle-bars 43 of breaker 23 will not be drawn down by the south-pole-ends of the highway-magnet 82, because the poles of those two magnetic elements are alike, but when those same needle-bars 43 pass over the north-pole-ends of the said highway magnet 82, then the lower north-pole-ends of said needle-bars 43 will be attracted by the said south-pole-ends of that magnet 82, and the breaker contacts 41 and 42 will be opened, so that the circuit to the electro-magnets 28, 27 of the selective-relay 20 will be momentarily deenergized.

When the needle-bars 50 of the breaker-element 24 on the automobile pass over the same highway-magnet 82 (Fig. 6) their lower north-pole-ends will be attracted by the south-pole-ends of said highway magnet 82 and the contacts 49, 48 of the breaker-element 24, will then be momentarily opened so as to interrupt the circuit through the electro-magnets 34, 35 of selective relay 21 and momentarily deenergize said latter magnets.

It should be borne in mind that just before this operation of both selective relays 20 and 21 takes place, both of said relays are in the normal position shown in Fig. 3 and the interruption, momentarily of both sets of selective-relay magnets 28, 27 and 34, 35, causes the two pendulum-bars 29 and 36 to swing from the right (as in Fig. 3) to the left as in Fig. 6.

When pendulum 29 of relay 20 swings over to and is held by electromagnet 28, said pendulum closes the red-lamp contacts 30, 31 and opens the normal green-lamp contacts 32, 33, thereby extinguishing the green lamp 15 and causing red lamp 17 to become illuminated.

At the same time, pendulum 36 swings from electro-magnet 34 to, and is held by, magnet 35, so that when it swings away from movable contact 38, the latter will close with contact 37 and thus close a circuit to the yellow lamp 16.

Thus when both breaker elements 23 and 24 are operated, a two light indication will be given to the driver of the automobile which will designate a certain kind of a danger zone.

The yellow light circuit will be the same as described in connection with Fig. 4, while the red light circuit will be as described in connection with Fig. 5, both of said circuits being readily followed by the darts shown in Fig. 6 of the drawings.

*Highway magnet installations*

It has hereinbefore been stated that permanent magnets are located on the highway to effect an actuation of one or the other or both of the breaker-elements on the automobile and the preferred forms of these magnets in connection with Figs. 11 and 12 have been described.

It has also been stated that I provide means for resetting the signal circuits, and thus restoring them to normal, when the danger point has been reached or has been passed.

The highway installations for effecting these operations will therefore now be explained, reference being made particularly to Figs. 7 to 10 inclusive in the drawings.

In the case of a sharp curve, a danger warning is necessary for traffic in both directions; therefore I locate a permanent magnet in the highway at each end of the curve.

If it be presumed that a yellow light will indicate a sharp curve, then the magnet installation must be such as to actuate that breaker-element 24 which controls the yellow light circuit, but which will not affect the red light circuit.

The yellow light circuit is shown in Fig. 4 of the drawing, and is controlled through movement of the north-pole-ends of the needle-bars 50, of breaker 24.

Therefore a highway magnet, such as 79 in Fig. 4, must be provided to produce the yellow indication on the automobile because the south-pole-ends of the magnet must be utilized to actuate the north-pole-ends of said needle-bars 50.

In Fig. 7, there is shown a curved stretch of highway 83 and at each end of the curve, I provide a permanent magnet installation 79, like the installation in Fig. 4, in that the south-pole-ends of the magnet bars are uppermost and the north-pole-ends depressed.

In this particular installation (Fig. 7) the magnets 79 may be extended all the way across the highway from side to side.

When an automobile traveling in the direction of the dart 84 passes over the magnet 79, and enters this curved danger zone, the uppermost south-pole-ends of the permanent magnet 79, will attract the north-pole-ends of needle-bars 50 of breaker 24, and momentarily open the breaker-contacts 49 and 48, thus causing pendulum 36 of selective-relay 21 to shift over to electro-magnet 35 (as in Fig. 4) and close a circuit through the yellow lamp 16.

The yellow lamp will thus give its indication, and continue to give it throughout the said danger zone as long as the pendulum 36 remains over against magnet 35, and allows the selective-relay yellow lamp-circuit contacts 38 and 37 to remain closed.

When the automobile passes out of said curved danger zone 83, it passes over the second permanent highway magnet 79, and again the south-pole-ends of this second magnet will attract the north-pole-ends of needle-bars 50 and thus again open contacts 49—48 momentarily, there again deenergizing magnets 34 and 35 of selective-relay 21, and permit the pendulum-bar 36 to swing back to its normal position and be held by magnet 34, whereupon it will move contact 38 away from contact 37 and open the yellow light-circuit and cut off the yellow indication signal.

When the pendulum-bar 36 leaves electromagnet 35 to return to its normal position against magnet 34, it allows contacts 40 and 39 to close and thereby restores the normal safe green-light-circuit at lamp 15.

It will thus be seen that the highway magnet 79 at one end of the curved danger zone 83 will interrupt the normal green light circuit and close the yellow light circuit, whereas the highway magnet 79 at the exit end of that danger zone will interrupt the yellow light circuit and close the green-light circuit to reset the signal to normal as the danger zone is passed.

In the case of a steep down-grade, where again the yellow light indication may be used, it is necessary to warn only the traffic in one direction for the danger may not be present on the up-grade of the same stretch of highway.

Under such a condition, it is only necessary to extend the magnets 79 part of the way across the highway from the down-grade side edge 85 because the breaker elements 23 and 24 are both preferably located on the right-hand side of the automobile and the highway-magnets 79 will extend far enough across the road to prevent the right-hand side of the automobile from passing around the end of the highway magnet.

The operation of setting and resetting the signal indicator in the installation shown in Fig. 8, is precisely the same as that which takes place in the installation shown in Fig. 7,—the only difference being that in Fig. 8, the highway magnets 79 are extended only part of the way across the highway so they will not signal a vehicle traveling toward an up-grade but only those traveling toward or on a down-grade.

In the case of a danger zone where a red light indication is to be given, for example, as for a railroad crossing, I prefer to arrange the highway magnets as indicated in Fig. 9 of the drawing wherein the highway 83, and the railroad 86 are shown as intersecting at right angles.

In this installation, I prefer to utilize four highway magnets 81 of the form shown in Fig. 5 in connection with the red light circuits, wherein the north-pole-ends of the said magnets are uppermost and the south-pole-ends depressed with respect to the highway surface.

This form of magnet is necessary because the red light circuit of lamp 17 is controlled through selective-relay 20, and that relay is in turn controlled by breaker-element 23, whose needle-bars 43 have their south-pole-ends lowermost and will be attracted only by north-pole-ends of the highway magnet 81.

While two highway magnets could be utilized in this railroad crossing-installation just as they are for a sharp curve as in Fig. 7,—one at each side of the railroad and extending all the way across the highway, and the one to set the signal upon approaching the danger point while the other will reset after the said danger point has been passed, yet I prefer to utilize two sets of highway magnets so that one set will operate signals on vehicles traveling in one direction while the other set will operate the signals on vehicles traveling in an opposite direction.

The reason for using two sets of highway magnets instead of one set is that traffic experts are opposed to anything which tends to unnecessarily slow up traffic on the highway and by utilizing two sets of highway magnets, I am able to place the resetting magnets so as to give a clear indication at or immediately after the point of danger is passed, whereas if only one set of magnets were used, the resetting of the signal on a vehicle traveling in one direction would be delayed until the magnet at the far end of the danger zone is passed, which latter magnet would be utilized to set signals on vehicles traveling in an opposite direction and would therefore have to be located far enough away from the actual point of danger to allow the speed of the vehicle to be reduced.

Therefore by referring to Fig. 9 of the drawing, it will be understood that highway magnet 87 will set the signal on vehicles traveling from right to left while highway magnet 88, will reset the signal immediately after the railroad has been crossed. For traffic in an opposite direction, left to right, the highway magnet 89 will set the signal while magnet 90 will reset the same after the danger point is passed.

Obviously, when the vehicle passes over the magnet 87 or 89 at the entrance to this danger zone (Fig. 9) the north-pole-ends of those magnets will attract the south-pole-ends of the needle-bars 43 of the breaker-element 23, and open contacts 42—41. The opening of these contacts will momentarily interrupt the circuit through electro-magnets 28, 27 of selective-relay 20, and allow pendulum 29 to swing over from the magnet 27 to electromagnet 28 and thus close the contacts 31 and 30 to complete the red-light circuit to lamp 17 (see Fig. 5) and when the pendulum is held by electro-magnet 28, it will open contacts 33, 32 and thus open the normal circuit to the green lamp 15. Thus the red-light indication will be given as the vehicle enters the danger zone.

When the resetting highway magnets 88 or 90 are passed, the needle-bars 43 will again be attracted; another deenergization of electro-magnets 28, 27 takes place and the pendulum 29 will swing back to electro-magnet 27 thereby restoring the normal green-light circuit through contacts 33, 32 and interrupting the red-light circuit at contacts 31, 30.

Next, it will be presumed that a danger zone is being approached, the signal indication for which on the automobile shall consist of both a red and a yellow light,—in other words a two-light indication.

Such a danger point may consist of two intersecting highways, as indicated in Fig. 10 of the drawings, to which reference will now be made.

When these two-light indications are desired, it is necessary to provide highway-magnet installations that will cause an actuation of both breaker-elements 23 and 24 and both selective-relays 20 and 21 on the automobile, such as is shown in Fig. 6 of the drawings.

In this highway installation (Figs. 6 and 10) the highway magnets must be arranged so that north-pole-ends of the magnets may coact with south-pole-ends of needle-bars 43, to operate breaker-element 23, and further, that south-pole-ends of the magnets must also be used to coact with north-pole-ends of needle-bars 50 of breaker-element 24.

While two separate magnets may be provided at each operating point, it is more convenient and less expensive to arrange the magnet-bars horizontally in the highway with all north-pole-ends at one side and all south-pole-ends at the opposite side of the magnet structure, but both in the same horizontal plane, so that the north-pole-ends will operate one breaker and the south-pole-ends will operate the other breaker on the automobile.

In this installation, the intersecting highways are designated 91 and 92 respectively and each highway preferably has installed therein two sets of permanent magnets,— one set for traffic in one direction and the other set for traffic in a reverse direction, but all of these magnet installations are alike so that both north and south-pole-ends thereof may be effective.

In the highway 91, there is one magnet installation 93 to operate both breaker elements 23 and 24 on the automobile so as to close circuits through both the red and yellow lamps 17 and 16 on the automobile before the intersection point 94 is reached and thus give the proper signal indication to the driver before the point of danger is reached. Then at the far side of the intersection 94, there is another magnet installation 95, which, when the automobile has passed the point of danger 94, will reset the signals.

For traffic in a reverse direction on the highway 91, there is a magnet installation 96 to set the signal and a magnet 97 to reset the signal after the intersection 94 is passed.

On the highway 92, I provide a like arrangement of magnets in that magnet 98 will set the signal for traffic in one direction while magnet 99 will reset the signal, and for traffic in a reverse direction on highway 92, there is a magnet 100 which sets the signal and another magnet 101 which will reset such signal.

The operation of these magnets is precisely as has been explained in connection with the red and yellow signal indications shown in Fig. 6 wherein the north-pole-ends of the highway magnets will operate the south-pole-ends of needle-bars 43, and the south-pole-ends of needle-bars 50 thereby actuating both breakers 23 and 24 and causing both pendulum-bars 29 and 36 to swing over to the positions shown in Fig. 6 so as to close the circuits through the red and yellow lamps.

Obviously, when a reset magnet, such as 95, 97, 99 and 101 is passed, the pendulums 29 and 26 will swing back to their normal positions and close a normal circuit through the green lamp 15, as shown in Fig. 3 of the drawings.

From the foregoing explanation, it is to be understood that by utilizing permanent magnets in the highway each with north and south-pole-ends and arranging those magnets so that either or both of those magnet poles are effective to attract one or another or both of two magnetic breaker-elements on the automobile, I am able to produce on the automobile a plurality of signal indications to warn the driver of his approach to a danger zone and to indicate the nature of the danger by a variation in the signals.

The present invention is an improvement upon the invention disclosed in my pending application for patent, Serial Number 124,347, filed in the Patent Office July 23d, 1926.

Having described my invention, I claim,—

1. The combination with an automobile, of an indicating means on the automobile to give a plurality of indications thereon, constantly operative permanent magnet means on the highway having magnetic north and south poles, controller means on the automobile having two magnetic elements,—one of which is operative only by a magnetic north pole and the other operative only by a magnetic south pole of a permanent highway magnet said constantly operative permanent highway magnet having its two poles arranged in the highway so that either or both poles may be in operative position to actuate either or both magnetic elements of the controller on the automobile according to the indication to be given when that magnet is passed and means operating between the two magnetic elements and the indicating means on the automobile to actuate the latter according to the operation of the magnetic means by the poles of the magnet on the highway when the latter is passed.

2. In a signal system for automobiles traveling on highways the combination with an automobile, of a plurality of signal devices on the automobile to give different signal indications thereon, controlling means on the automobile to control the several signals said controlling-means including a pair of magnetic devices one of which is responsive to a magnetic north pole and the other one of which is responsive to a magnetic south pole, a highway magnet on the highway having its north magnetic pole only thereof effective on one control device on the automobile, another highway magnet on the highway with its south magnetic pole only effective on the other control device on the automobile, a third highway magnet on the highway with its north magnetic pole effective on one of said control devices on the automobile and its south magnetic pole effective on the other of said control devices on the automobile whereby one magnet will operate one magnetic device of the controlling means, another magnet will operate another of said magnetic devices and the third magnet will operate both magnetic devices on the automobile to give predetermined signal indications at each highway magnet.

3. The combination with an automobile, of an indicating means on the automobile to give a plurality of indications, means on the automobile for giving a normal safe indication at the indicating means, permanent magnet means on the highway having magnetic north and south poles, one control means on the automobile subject only to a magnetic north pole of a permanent highway magnet said control means controlling the indicating means so that when it is operated by the magnetic north pole of a highway magnet to which it is subject, the normal indication will be interrupted and a predetermined indication will be given at the indicating means and another control means on the automobile subject only to a magnetic south pole of a permanent highway magnet said other control means controlling the indicating means so that when it is operated by a magnetic south pole of a highway magnet the normal indication will be interrupted and another predetermined indication given at the indicating means.

4. In a signal system for automobiles traveling on trackless highways the combination with an automobile, of a plurality of signal devices on the automobile to give different signals thereon, selective relays on the automobile, signal circuit connections between the selective relays and signals, two controllers on the automobile,—one having a magnetic element responsive only to a north magnetic pole of a permanent magnet and the other having a magnetic element responsive only to a south magnetic pole of a permanent magnet, both of said controllers being operatively connected with the selective relays, a constantly operative permanent magnet on the highway with its north magnetic pole only arranged to operate one of the said magnetic elements on the automobile, and another constantly operative permanent magnet on the highway with both of its poles arranged to operate both of said magnetic elements on the automobile whereby a different signal will be given according to the operation of one or both magnetic elements on the automobile by highway magnets.

5. In a signal system for automobiles traveling on trackless highways the combination with an automobile, of a plurality of signal devices on the automobile, means for normally maintaining a safe signal indication on the automobile, constantly operative permanent magnets arranged on the highway at dangerous places said permanent magnets having magnetic north and south poles but each arranged with only one of its two poles operative, one means on the automobile operated only by the flux from north poles of permanent highway magnets to cut off the normal signal and to control another signal device, another means on the automobile operated only by the flux from south poles of permanent highway magnets to cut off the normal and substitute another signal indication and means for restoring the signal indications to normal between other signal indications.

In testimony whereof I affix my signature.

CHARLES ADLER, Jr.